April 3, 1951 A. J. WAHL 2,547,294
APPARATUS FOR MAKING POTTERY WARE
Filed Feb. 13, 1946 10 Sheets-Sheet 1

INVENTOR.
Albert J. Wahl.
BY George J. Cronin
ATTORNEY

Fig. 3.

April 3, 1951  A. J. WAHL  2,547,294
APPARATUS FOR MAKING POTTERY WARE
Filed Feb. 13, 1946  10 Sheets-Sheet 4

INVENTOR
Albert J. Wahl.
George J. Croninger
ATTORNEY

April 3, 1951 — A. J. WAHL — 2,547,294
APPARATUS FOR MAKING POTTERY WARE
Filed Feb. 13, 1946 — 10 Sheets-Sheet 9

INVENTOR
Albert J. Wahl.
BY
George J. Cuminge
ATTORNEY

April 3, 1951     A. J. WAHL     2,547,294
APPARATUS FOR MAKING POTTERY WARE
Filed Feb. 13, 1946     10 Sheets-Sheet 10

INVENTOR
Albert J. Wahl.
BY

ATTORNEY

Patented Apr. 3, 1951

2,547,294

UNITED STATES PATENT OFFICE 2,547,294

APPARATUS FOR MAKING POTTERY WARE

Albert J. Wahl, Pleasant Hills, Pa., assignor to Miller Pottery Engineering Company, Swissvale, Pa., a corporation of Pennsylvania Application February 13, 1946, Serial No. 647,289

10 Claims. (Cl. 25—2)

This invention relates to apparatus for making potteryware. It has to do particularly with the manufacture of dinnerware from plastic ceramic material, starting with the operation of fabricating the ware and ending with the removal of the ware from the mold.

In a co-pending application to Robert E. Gould, Serial No. 586,284, filed April 3, 1945, now abandoned, there is disclosed an automatic jiggering machine, and a dryer of the type employing infra-red rays as a heating medium, the two being operated in conjunction with one another for forming and drying respectively, various shapes and forms of potteryware. The automatic jiggering machine mentioned is arranged to fabricate ware on molds which are moved therethrough in a single line, however, in the dryer, the molds are carried through the drying chamber in rows arranged transversely of the direction of travel. In manually transferring molds between the automatic fabricating machine and the dryer, certain difficulties have arisen in connection with properly placing and arranging the molds and also in consistently keeping pace with the uniform fabricating and drying speed in performing mold transferring operations.

The present invention has to do primarily with the matter of transferring molds from the automatic jiggering machine to the dryer conveyor and arranging the molds in proper position thereon as well as removing the molds from the dryer and arranging them for return feeding to the automatic jiggering machine in a system wherein the molds are carried through the jiggering machine in a single line and through the dryer in rows arranged transversely of the direction of travel thereof and wherein all of the operations, including those of fabricating, drying, mold handling and transporting are carried out in fully automatic fashion.

An object of this invention to provide a fully coordinated installation including such elements as a ware fabricating machine, dryer, mold conveyor equipment, and mold transferring and handling equipment arranged and operated as an integrated whole for the manufacture of the ware of the class described.

The fact that mold movements throughout the cycle are carried out mechanically and in automatic fashion without need for manual intervention, gives rise to certain practical advantages. For instance, the operational hazards and interruptions that accompany manual intervention are eliminated. Not only can higher operating speeds be established, but they can also be maintained because in the latter instance, the human fatigue factor is no longer present. Also, the equipment may be operated at full mold capacity and, if need be, at maximum production capacity. These factors all contribute to an increase in the amount of ware made and a decrease in the cost of production.

Additionally, this invention also contemplates the automatic stripping of the ware from the molds and the automatic handling of molds through this station by machinery co-ordinated with and controlled by the jiggering machine, thereby to make the cycle completely automatic and remove the drawbacks and disadvantages of manual intervention.

In the drawings:

Figure 18 is a perspective view, with some of the parts in section of part of the apparatus of Figure 15.

Figures 1, 2:
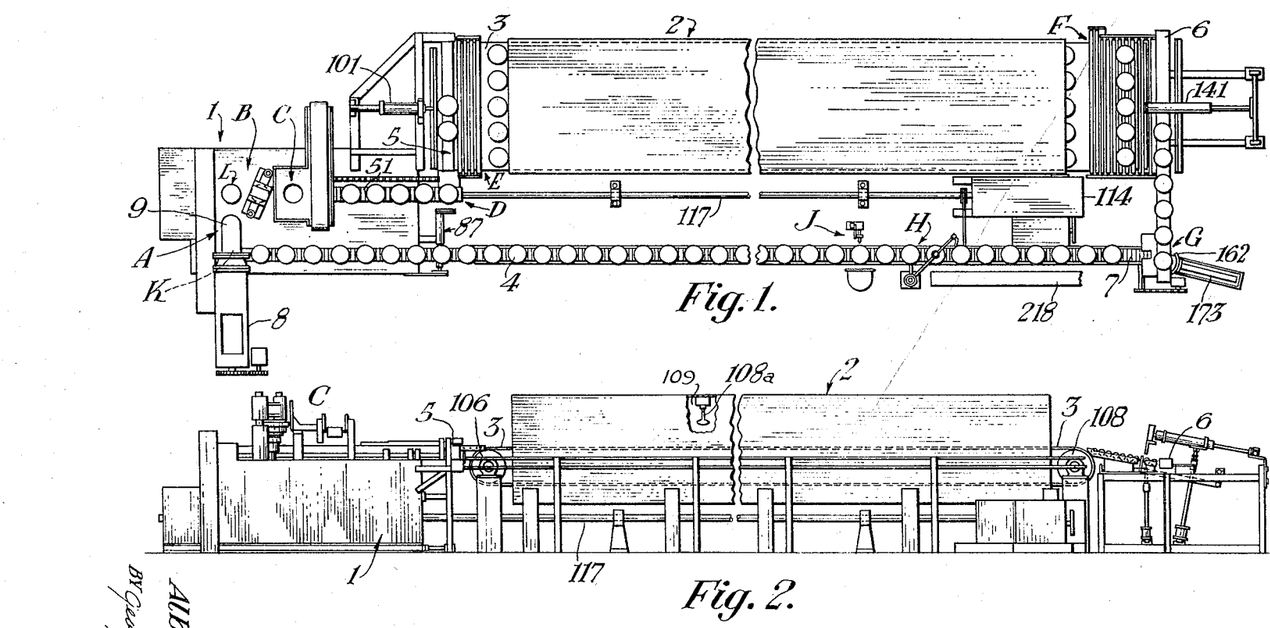
Figures 1 and 2 are top plan and side elevation views respectively of an installation embodying the improvements hereof, some of the parts shown in the plan view being omitted in the elevation, notably the return mold conveyor and pug mill feeder.

With reference to Figures 1 and 2, 1 designates an automatic jiggering machine and 2 a dryer of the type having a wide, flat conveyor 3 running from end to end of the dryer housing preferably in a horizontal plane. The molds 4 on which the ware is made are carried through the fabricating machine in single file and through the dryer in transverse, parallel rows. They are charged with clay at station A, the clay pressed out and bonded to the molds at station B, the clay jiggered or profiled at station C after which the molds are carried out to the right to a transfer station D, where they are placed on a conveyor and carried to the dryer. Station E at the entrance end of the dryer is where the molds are removed from conveyor 5 and placed on the dryer conveyor 3, these operations being performed automatically by mechanism to be hereinafter described in detail.

At the exit end F of the dryer, the rows of molds are unloaded automatically and placed in single file on a conveyor 6 which carries them to station G where they are transferred to a conveyor 7. At station H adjacent conveyor 7, the ware is automatically stripped from the molds and at station J, the molds are automatically cleaned of cracked or broken ware or pieces not removed at H. The molds are carried in single file on conveyor 7 to a transfer point K from whence they are returned to the mold charging station A, to complete the cycle which is fully automatic throughout.

Clay is preferably fed to the jiggering machine automatically. While there are several types of automatic feeder which may be used, I prefer to employ a feeder such as that disclosed in my copending application Serial No. 577,444, filed February 14, 1945 now Patent No. 2,494,112. Said feeder is not shown in detail herein, however it comprises generally, a power driven pug mill 8, Figure 1, whose extrusion is delivered by a pipe 9, Figure 5 to station A to be severed into slices that are deposited on molds therebelow by a mechanically operated cutter 10.

Figure 3:
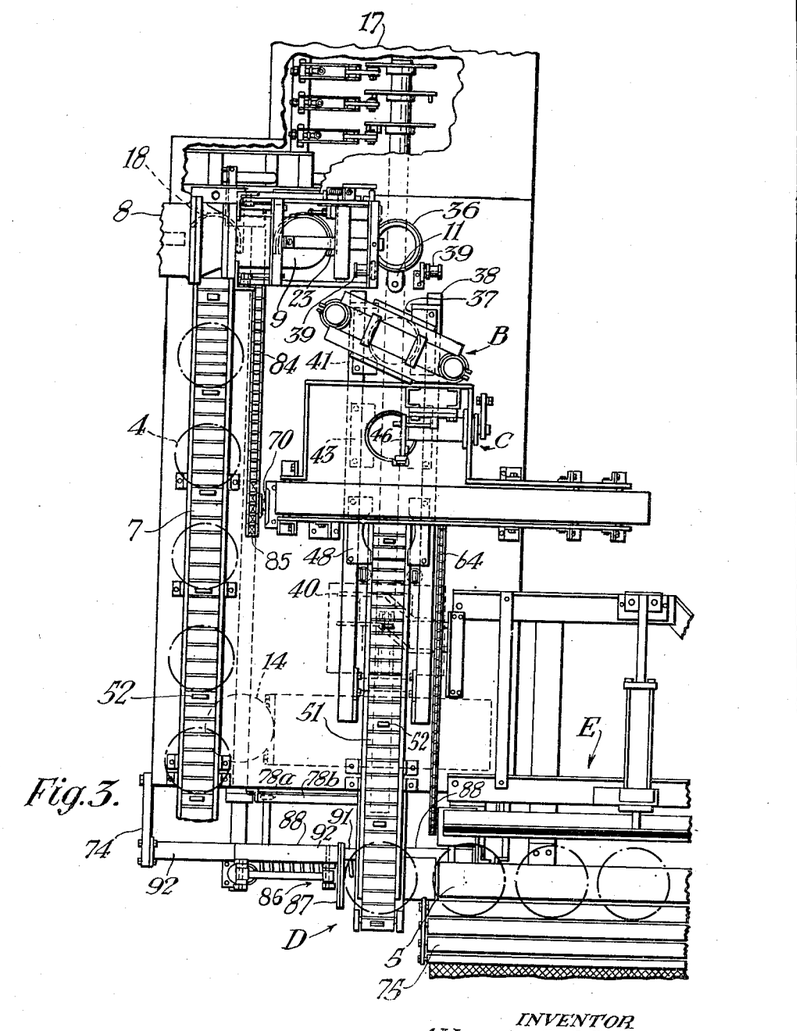
Figure 3 is a plan view of the jiggering machine.

It will suffice here to say that the operation of the pug mill and slicer is automatic and is controlled by a timer 17 associated with the fabricating machine Figure 3, to cut off and deliver slices of clay of uniform volume to molds therebelow at the charging station.

Figure 8:
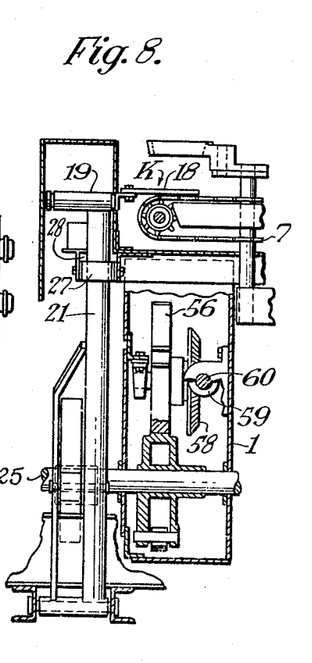
Figure 8 is a detail partly in section and in side elevation part of the jiggering machine mold conveyor drive.

The molds 4, are arranged in single file and in predetermined spaced relation on conveyor 7 which comprises a flat top conveyor chain, Figure 3. They are delivered one at a time into a movable transfer fork 18, Figure 8, which operates between stations K and A. Said transfer fork receives a mold 4 through the open end and lifts and carries the mold from one station to another by engaging it underneath the brim. The fork is mounted on a frame 19, Figure 5, carried by a pair of spaced, parallel posts 20 and 21 pivoted at their lower ends to the machine frame 22. Another mold fork 23 is attached to the frame for carrying molds between station A and a transfer point L (Figure 1) just ahead of station B. The posts 20 and 21 are moved in one direction by a cam 24 on main cam shaft 25 driven by motor 15, and gear drive 16, Figures 3 and 4. A return spring 26 is provided to move the posts in the other direction, and they are guided in their back and forth movement by rollers 27 which roll in a horizontal guideway 28.

Figure 4:
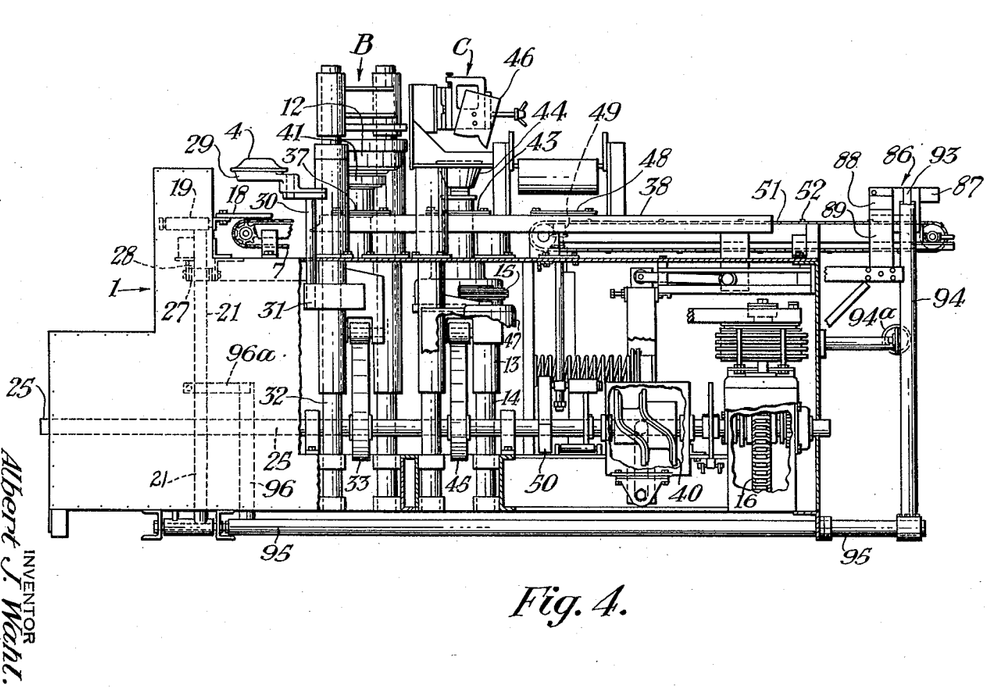
Figure 4 is a side elevation thereof.

Fork 18 carries a mold from the conveyor 7 to a position directly over a hollow ring chuck 29, smaller in diameter than the fork 18 so as to pass therethrough. Said ring chuck is supported in an offset position on a post 30, Figure 6, socketed in the press crosshead 31 in rear of the chuck. The press crosshead 31, Figure 4, is raised and lowered on guides 32 by a cam 33 fixed on cam shaft 25 and spaced from cam 35. Thus when chuck 29 is elevated, the tang of the mold seats in the ring chuck 29 and it is lifted from the fork 18 where it is supported on the brim and is carried upwardly to the feeding position coincidently with the cutting off of a slice of clay.

Figure 5:
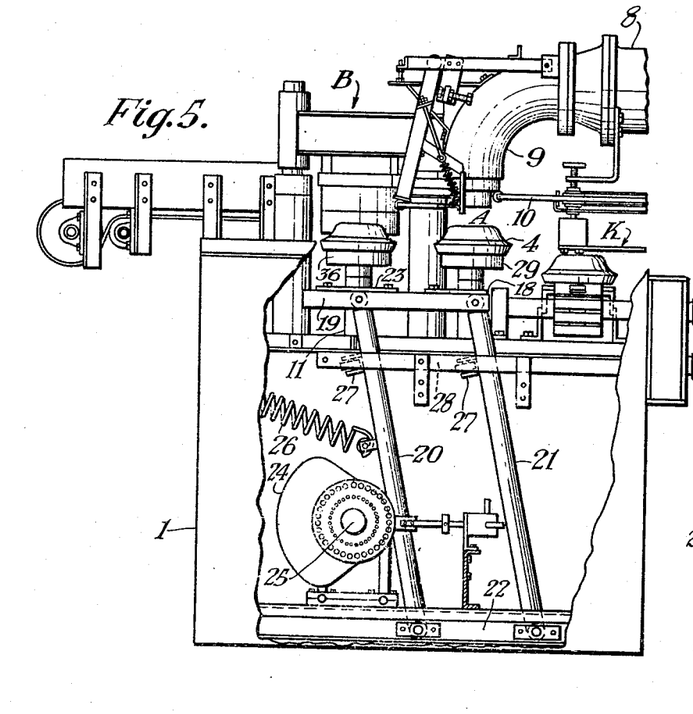
Figure 5 is an end view of the jiggering machine showing the feeding station and certain mold transferring and transporting apparatus.

After the mold has been charged with clay, the chuck 29 is lowered by cam 33 into the other fork 23 of the transfer, Figures 3 and 5, which has been moved to the right by cam 24 during the interval when the charge of clay was being cut off and deposited on the mold. When the transfer again moves to the left, the charged mold is carried to a position directly over another ring chuck 36 mounted on a post 11 carried by crosshead 31.

Figure 6:
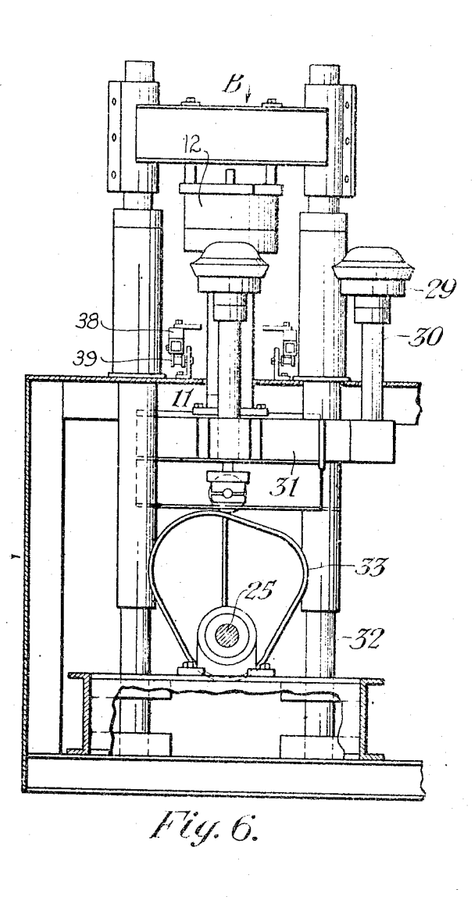
Figure 6 is a sectional elevation through the jiggering machine showing the press station, some parts of the jiggering machine being omitted.

As best seen in Figures 3, 4 and 6, chuck 36 lifts the mold out of fork 23 and holds it in raised position until the fork 23 again moves to the right and the left end seat 37 of a multiple seat, longitudinally divided, horizontally reciprocable transfer 38, slides on rollers 39 into position therebelow. Transfer 38 is moved back and forth by a drum cam 40, once every revolution of main cam shaft 25. When seat 37 is underneath chuck 36, the chuck is dropped by cam 33 through the seat and this deposits the mold 4 by the brim on the seat 37. Upon the next movement of transfer 38, the mold is carried to station B where the transfer halts momentarily while the mold is lifted from below by a mold lifter or press chuck 41 on crosshead 31 elevated by cam 33. The charge of material on the mold is pressed against a heated, contoured die 12 to spread the material over the molding surface of the mold and prepare the material for jiggering. During the interval while the clay is being pressed out, transfer 38, is moved to the left to bring the center seat 43 below press chuck 41. Chuck 41 is then lowered to deposit the mold in this center seat and the transfer thereafter is moved to the right to carry the mold to station C. At this station the center seat 43 dwells over a vertically movable mold lifter or jigger chuck 44 on crosshead 13 sliding on columns 14 which is elevated by jigger cam 45 on shaft 25 to raise the mold out of the seat and lift it up to the stationary profile tool 46. The jigger chuck 44 is rotated by motor 47 and associated drive 15 as the mold is raised off the transfer thereby to rotate the mold and jigger the ware by relative rotation between the profile tool and clay.

While the ware is being jiggered, the transfer 38 moves to the left and stops with the right end mold seat 48 below the elevated jigger chuck 44 which then lowers to deposit the mold with the freshly formed ware thereon in seat 48. The transfer then shifts to the right to carry the mold in seat 48 over a mold lifter 49 which is raised by cam 50 on shaft 25 and is operable to lift the mold up off the transfer and when the transfer again moves to the left, to set the mold down on a flat top conveyor chain 51 (Figures 1, 3 and 4).

Conveyors 51 and 7 are similar in construction and are driven in unison and in timed relation with each other and with the mold transfer 38. Said conveyors are moved intermittently by mechanism to be hereinafter described having upstanding lugs 52, Figure 3, fastened at predetermined spaced intervals to the top plates of both chains. The center to center spacing of these lugs represents substantially the distance each conveyor travels each machine cycle and the molds are set on the conveyors between these lugs.

A Geneva drive is provided to move conveyors 51 and 7. Said drive comprises a disc 53, Figure 7, fixed on cam shaft 25 having a roller 54 which enters one of the slots 55 of Geneva gear 56 each revolution of the cam shaft. Geneva gear 56 is fixed on a shaft 57 journaled in the machine frame which has a gear 58, Figure 8, secured thereto for driving a pinion 59 on sprocket shaft 60. Sprocket 61 on shaft 60 drives sprocket 62 on shaft 63 by means of sprocket chain 64. Gear 65 on sprocket shaft 63 meshes with and drives gear 66 on sprocket shaft 67 which has a sprocket 68 thereon to which conveyor chain 7 is attached.

Figure 7:
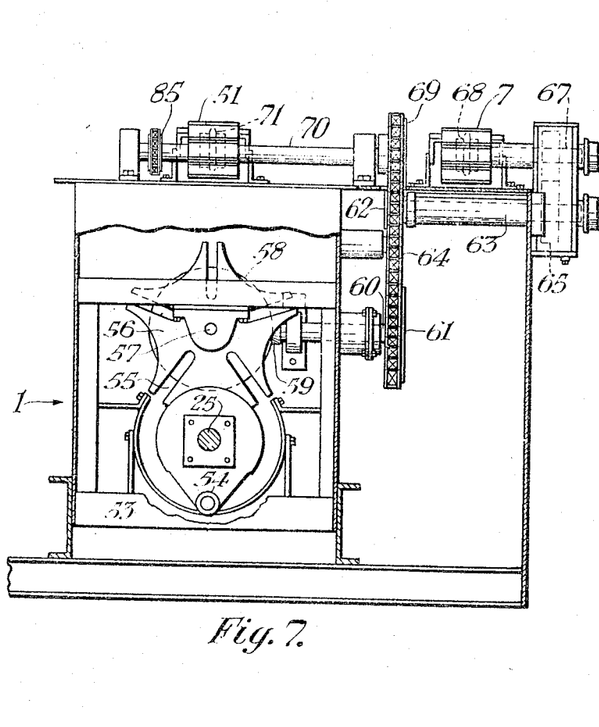
Figure 7 is a sectional elevation through the jiggering machine showing the mold conveyors and the drive through some parts of the jiggering machine being omitted.

To drive conveyor 51, chain 64 is also connected to a sprocket 69 on cross shaft 70, Figures 3 and 7, mounted on bearings on top of the machine frame; and another sprocket 71, secured to this shaft, drives conveyor 51. The rear end of conveyor 51 is supported on sprocket shaft 73 mounted on bearings 74 at the rear end of the machine frame.

Figure 11:
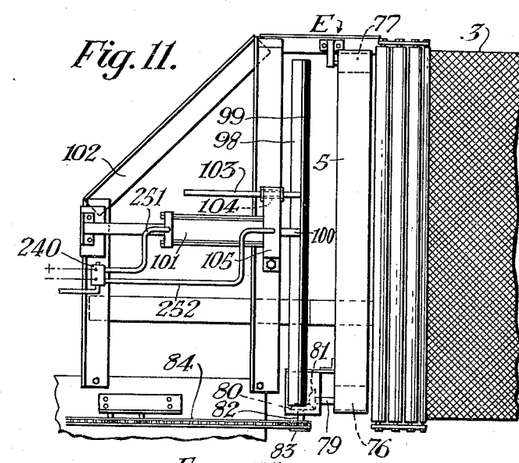
Figure 11 is a plan view of apparatus for placing molds in the dryer.
Figure 12:
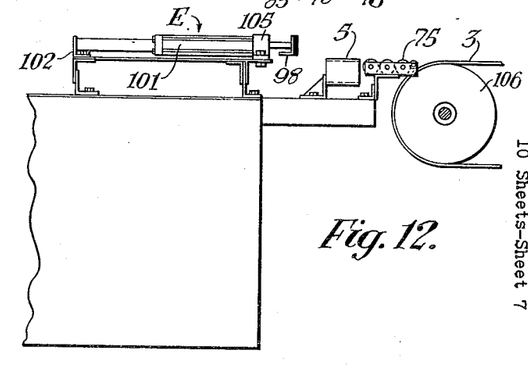
Figure 12 is a side elevation of the apparatus of Figure 11.

As best shown in Figures 3, 7 and 11, the molds are transferred at station D from conveyor 51 to conveyor 5 positioned at right angles thereto adjacent the end thereof and extending across in front of a gravity conveyor 75 formed of a plurality of tubular rollers leading to the dryer conveyor 3. Conveyor 5 comprises a belt supported between rollers 76 and 77. Roller 76 is fixed on a shaft 79 having a gear 81 mounted thereon. This gear is driven by a gear 80 mounted on a shaft 82 having a sprocket 83 thereon driven by chain 84 which is intermittently driven by sprocket 85 on cross shaft 70.

Figure 9:
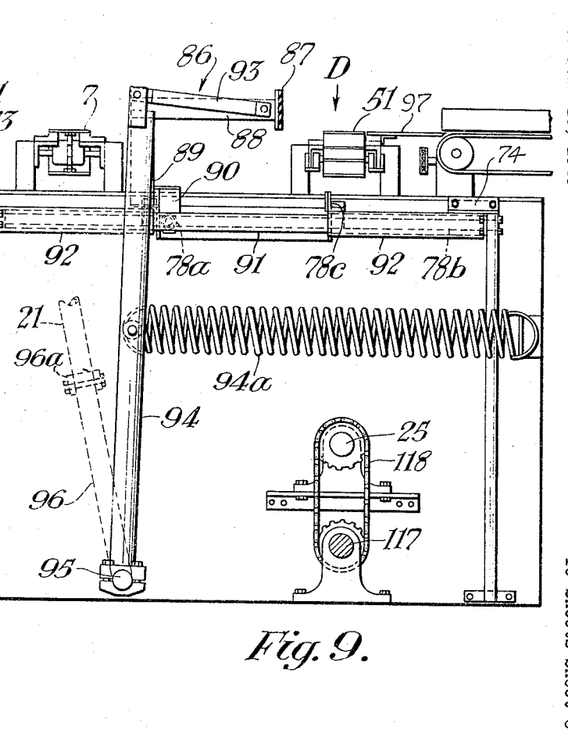
Figure 9 is an end elevation of the jiggering machine showing the apparatus for removing molds from the jiggering machine.
Figure 10:
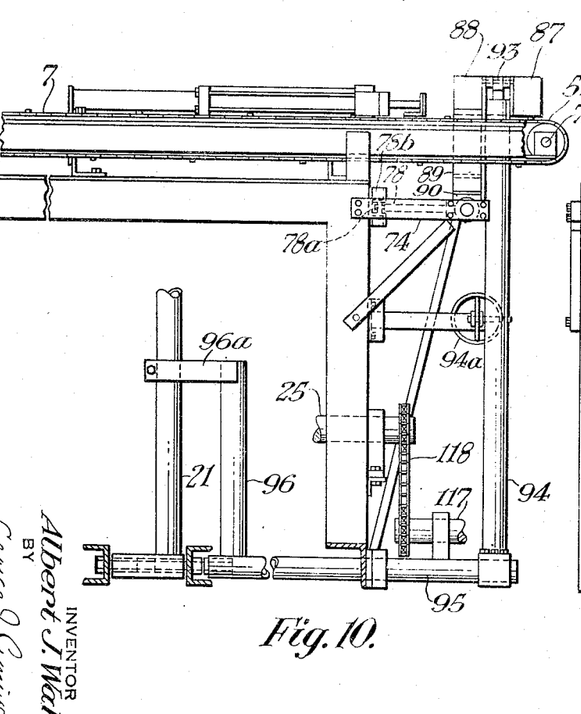
Figure 10 is a side elevation of the transfer apparatus shown in Figure 7.

To transfer molds from conveyor 51 to conveyor 5, a pusher 86 is provided, Figures 3, 9 and 10. This apparatus comprises a vertical pusher plate 87 faced with resilient material so as not to damage the molds, supported by a horizontally rearwardly extending bar 88 rigidly secured to the top of a post 89. Post 89 is attached to a block 90 secured to a tubular slide 91 supported by and reciprocable in a pair of spaced, aligned tubular guides 92 supported from the machine frame, by brackets 74. This arrangement insures of straight line, guided back and forth movement for the pusher plate 87. An outrigger 78 secured to slide 91 and having a roller 78a running in a track 78b secured to the side of the machine, prevents angular movement of the pusher 87. Bumpers 78c cushion the stroke of slide 91.

The pusher is actuated by apparatus comprising a link 93 pivoted at the back of plate 87 pivotally connected to the top of post 94, Figures 4 and 9. Post 94 is clamped at the lower end to a shaft 95 running lengthwise along the base of the machine and mounted in suitable bearings. Said shaft has a post 96 welded thereto and this post is clamped to angularly movable post 21 by clamp bracket 96a thereby to transmit angular movement to said shaft and reciprocate the pusher plate 87 during the periods of idleness of conveyors 7 and 51. Molds removed from conveyor 51 are pushed across a flat plate 97 bridging the space between the end of conveyor 5 and conveyor 51. The pusher stroke may be adjusted by changing the angular position thereof on shaft 95. A return spring 94a is connected to post 94 and to the machine frame.

The machine hereof is arranged to make one size or type of ware at a time. This comprehends the use of molds of uniform specifications for a given type of ware, however the production may be changed from one size of ware to another by making certain adjustments to be hereinafter set forth. Assuming, for the sake of explanation, that the machine is set up for small flatware employing molds having an overall diameter of 6 or 7 inches, and that five molds of this size may be accommodated in closed up relation transversely of conveyor belt 3, then the amount of travel of conveyor 5 each machine cycle will be sufficient only to provide the desired closed up relationship of the molds. When the production is changed to molds of larger or smaller size some adjustment may be required in the amount and speed of travel of conveyor 5, however, this can easily be accomplished by changing the ratio of gears 80 and 81.

After a row of molds has been assembled on conveyor 5, they are pushed, as a row, across gravity conveyor 75 onto conveyor 3, Figures 1 and 11. The pusher apparatus employed for this operation comprises an elongated blade 98 having a resilient facing 99 to avoid damage to the molds. This blade is located above the level of the top of conveyor 5 and is centrally supported by a piston rod 100. Piston rod 100 forms a part of an air cylinder assembly 101 rigidly supported by a frame 102. To prevent angular movement of the blade, a slide bar 103 is secured to the back thereof and this bar is received in a dovetail groove 104 in an extension of the cylinder head casing 105.

Conveyor 3 is preferably a metal mesh belt carried by rolls 106 and 108, Figure 2, at opposite ends of the dryer with such intermediate rolls or supporting means as may be required to prevent the belt from sagging and to insure smooth operation thereof. The belt operates in a drying chamber 109 heated by preferably employing a combination of infra-red heat lamps 109a, and forced, heated air to dry and release the clay from the molds. The molds are conveyed therethrough in rows arranged transversely of the belt and preferably in abutting relation so as to conserve space.

Figure 14:
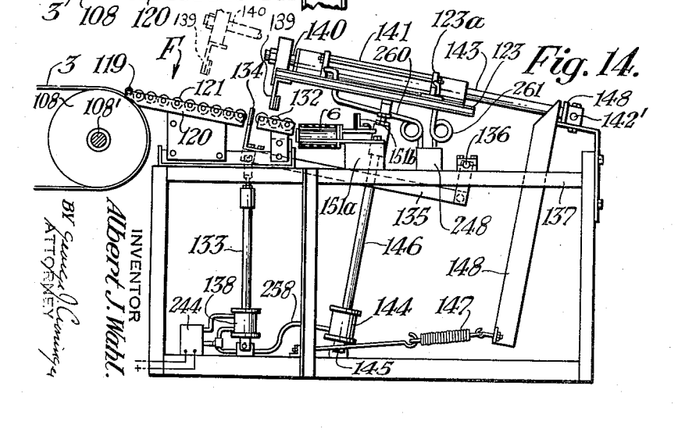
Figure 14 is a side elevation of the apparatus of Figure 13.
Figure 23:
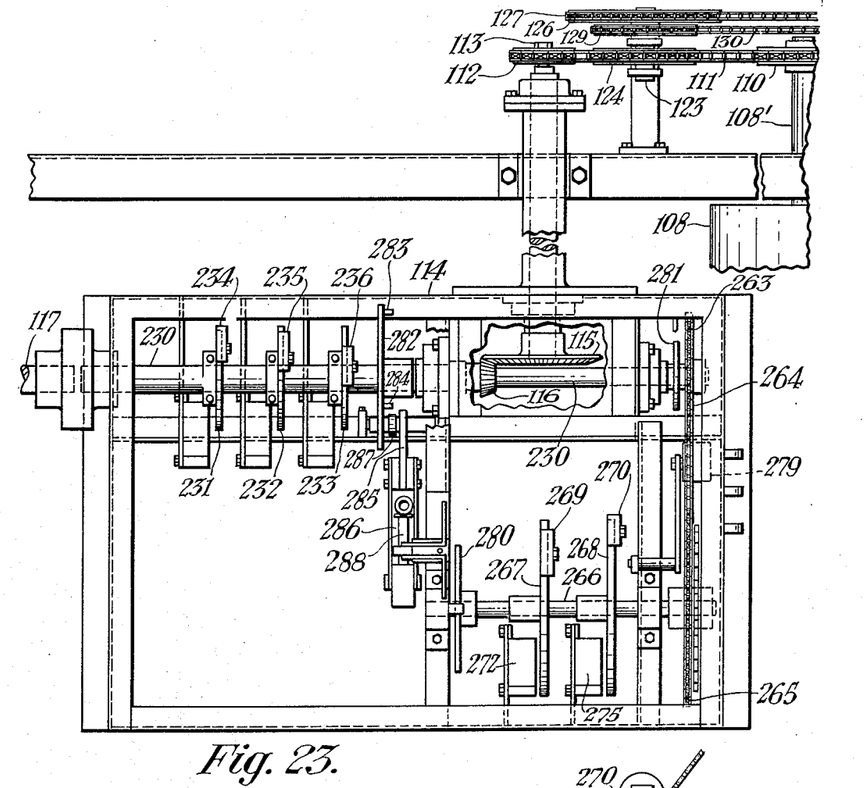
Figure 23 is a plan view showing some of the control mechanism.

To continuously move conveyor 3, the exit end roll or drum 108 is fixed on a shaft 108', Figures 14 and 23. Secured to the shaft beyond the bearing on the far side of the dryer is a large sprocket 110, Figure 23, and this is driven by a chain 111 connected to a smaller sprocket 112 on drive shaft 113. The speed of travel of conveyor 3 may be changed by substituting sprockets of different size for sprocket 112. Shaft 113 is journaled in the dryer frame and extends across on the near side of the dryer to a timer 114 where it is connected by a bevel gear 115 to a drive pinion 116 on drive shaft 117 inside the casing. Shaft 230 is coupled to drive shaft 117 which extends forwardly alongside the dryer frame, (Figure 1) to the fabricating machine where it may either be coupled directly to cam shaft 25, Figure 9, or if shaft 117 operates at a lower or higher level than shaft 25, due to differences in level of the fabricating machine and dryer, shaft 117 may be connected by a one to one sprocket and chain drive 118 to cam shaft 25.

Figure 13:
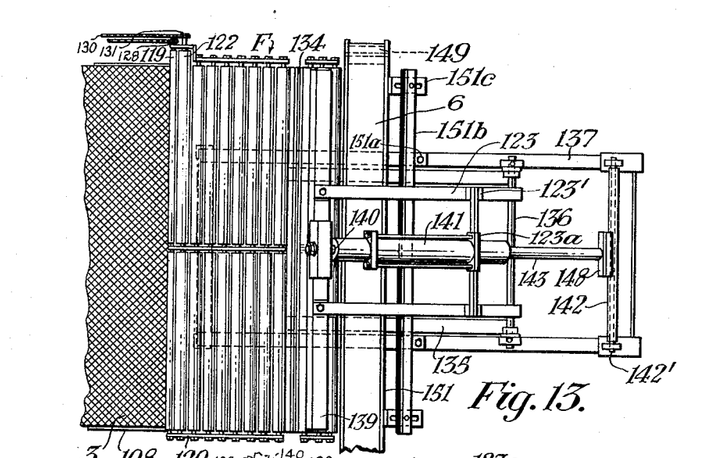
Figure 13 is a plan view of apparatus employed at the exit end of the dryer to control mold movements therefrom.

As the rows of molds leave the exit end of the dryer, they pitch forward over the crown of the roll and then roll downwardly onto a small diameter roller 119, Figures 13 and 14, journaled in a roller frame 120 on frame 137 having several larger diameter gravity rolls 121 mounted thereon, the frame being inclined downwardly at substantially 10° to the horizontal. The lead roll 122 of this group of larger rollers and roll 119 are both driven at the same peripheral speed and at a speed in excess of the speed of conveyor 3 so as to separate the rows of molds as they leave the dryer. To drive rollers 119 and 122, a sprocket 124, Figure 23, is mounted on shaft 123 and connected to chain 111. On shaft 123 is secured a sprocket 126 connected by chain 127, to sprocket 128, Figure 13 on the end of roller 119. A smaller sprocket 129 mounted on shaft 123 is connected by chain 130 to sprocket 131 for driving roller 122. The desired peripheral speed of rollers 122 and 119 can be obtained by employing sprockets of proper diameter.

At the lower end of roller frame 120, Figures 1 and 14, is a rubber faced, vertically movable stop or bumper plate 134 extending the full width of the frame and the purpose of this bumper plate is to arrest the downward movement of a row of molds across the gravity conveyor for a predetermined interval until the preceeding row of molds has been carried away by conveyor 6, and then to release the row of molds for movement over gravity conveyor 132 on frame 137 onto conveyor 6. Said stop member 134 is secured to a swingable frame 135, pivoted on a cross shaft 136, to the main frame 137. Air cylinder 138, which is pivotally connected to the lower side of frame 137, has a piston rod 133 pivotally connected to frame 135, below the stop member 134, the purpose of this air cylinder assembly being to raise the stop member at a predetermined time in the cycle of operations. The weight of the frame and stop member are depended upon to lower the stop member when the air cylinder is vented. The mold engaging side of stop member 134 is covered with resilient material.

When stop member 134 is lowered below the top of the lower end roller 121, the row of molds will roll down gravity conveyor 132, however, the momentum may not be sufficient to cause them to reach properly seated position on conveyor 6. To positively insure that each row of molds does reach its properly seated position on conveyor 6, a mold puller is provided in the form of an overhead blade 139 formed as an angle whose rear vertical face is covered with resilient material to avoid damage to the molds. Said blade is bolted to a piston rod 140 forming a part of an adjustable stroke air cylinder assembly.

The rear end of the cylinder casing 141 is pivotally connected to a rod 143 attached to a tubular bearing 142 sleeved on rod 142' held between opposed clamps fastened to the frame 137. The blade is raised and lowered by air cylinder 144 pivoted at 145 on frame 137 and whose piston rod 146 is pivotally connected to the cylinder casing 141. A counterbalancing spring 147 is anchored to frame 137 and connected to a channel 148 secured to bearing 142. To prevent angular movement of the blade 139 on the axis of rod 140, a pair of guide bars 123 are attached to the top of the blade and they extend rearwardly beneath a pair of stationary guide plates 123' supported from the rear cylinder head 123a.

Figures 25, 26:
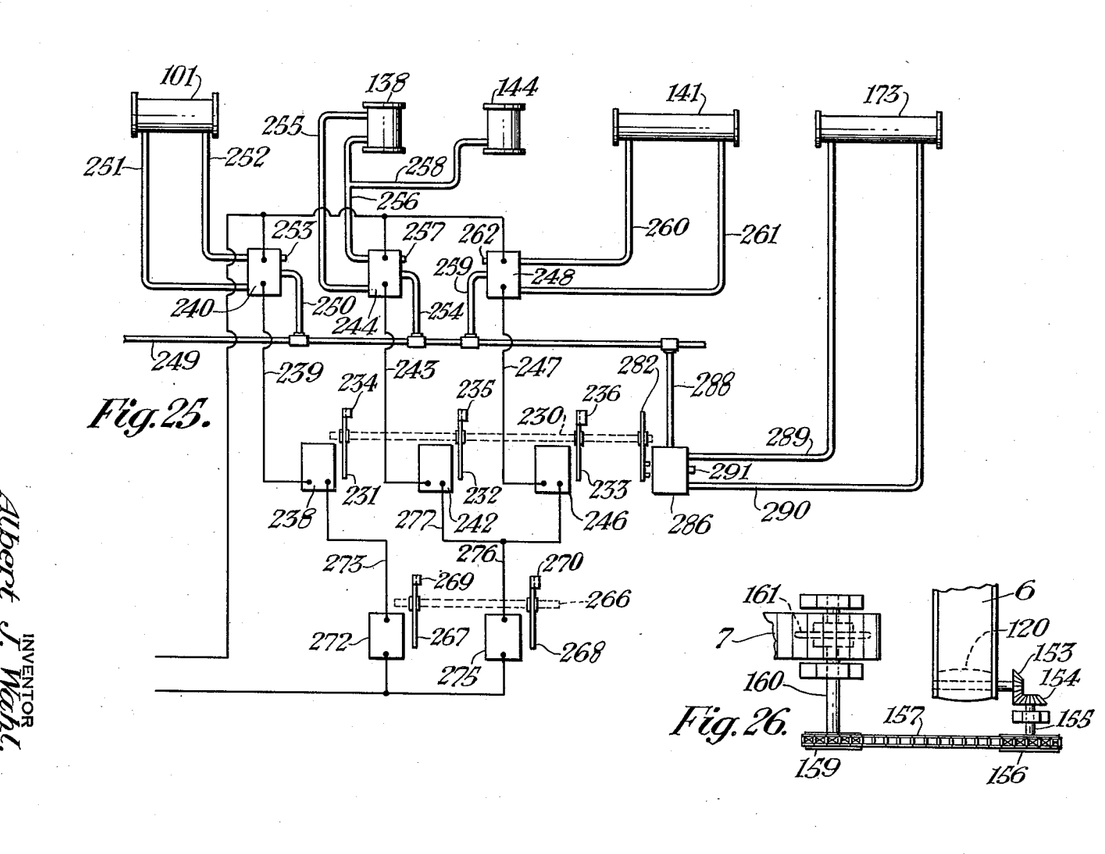
Figure 25 is a piping and wiring diagram illustrating how some parts of the machinery are electrically pneumatically controlled.
Figure 26 is a detail illustrating a drive connection between two of the mold conveyors.

Conveyor 6 comprises a narrow width belt supported by rollers 149 and 150 carried by elongated frame 151, Figure 13, mounted on brackets 151a bolted to the top of frame 137. Along one side of the frame is a rubber surfaced backstop 151b adjustably mounted on support bars 151c welded to the side of frame 151. This member is instrumental in properly aligning molds on conveyor 6 and also in preventing them from falling or being pulled off conveyor 6. Roller 120, Figure 26, is fixed on shaft 152 which has a gear 153 thereon driven by gear 154 on shaft 155. Shaft 155 has a sprocket 156 fixed thereon driven by a chain 157 and a sprocket 159 on shaft 160 on which the rear sprocket 161 for conveyor 7 is mounted and from which shaft 160 derives motion. Both conveyors are intermittently moved by geneva 53, Figure 7.

Figures 15, 16, 17, 19, 20, 21, 22:
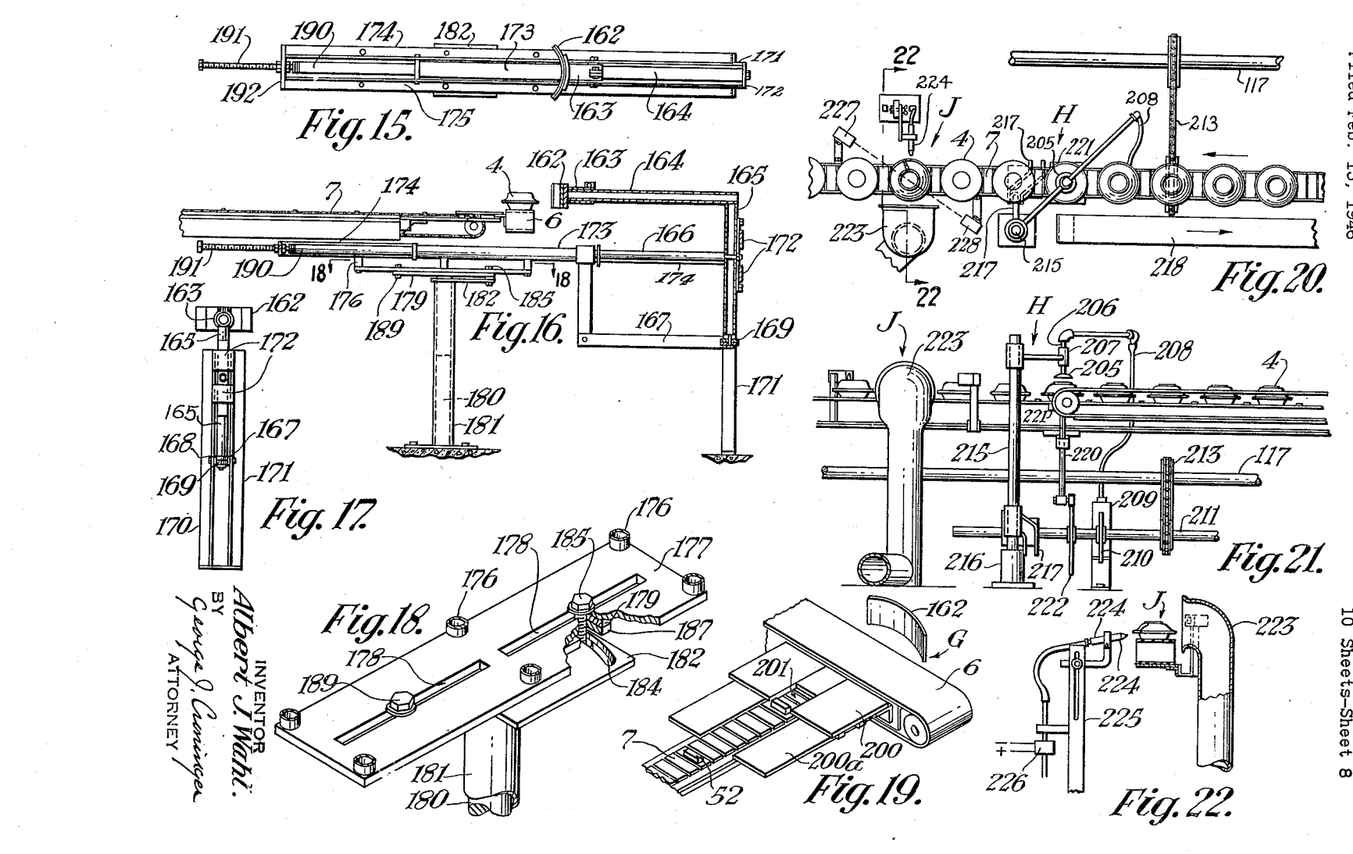
Figure 15 is a plan view of apparatus employed to transfer molds to the return conveyor associated with the jiggering machine.
Figure 16 is a side elevation of the apparatus of Figure 15.
Figure 17 is an end view of the apparatus of Figure 15.
Figure 19 is a perspective view showing a transfer plate used with the apparatus of Figure 15.
Figure 20 is a plan view of the ware stripping stations.
Figure 21 is a side elevation of the apparatus of Figure 20.
Figure 22 is a detail, partly in section, taken in line 22—22 of Figure 20.

The discharge end of conveyor 6 is located at station G, Figures 1 and 19, where molds are transferred from it to conveyor 7, which operates at right angles thereto. The apparatus for transferring molds from conveyor 6 to conveyor 7 comprises an arcuate mold engaging member 162, Figures 15 and 16 faced with resilient material having a tubular clamp 163 sleeved on a pipe 164 welded to a vertical support 165. Said support 165 is fixed to a horizontal piston rod 166 and the lower end thereof is provided with an anti-friction roller 169 which rolls between guides 167 and 168, Figure 17, formed as part of a supporting frame which includes a pair of spaced vertical end posts 170 and 171, joined together by cross members 172 for stability.

Said piston rod forms part of an air cylinder assembly having an air cylinder 173 supported by a rectangular frame section 174 which is joined as by welding to the posts 170 and 171. The air cylinder is secured to this frame section by bolts 175 and the frame rests on and is fixed to a plurality of small posts 176 secured to a plate 177, Figure 18. Plate 177 has a pair of spaced, longitudinal slots 178 and rests on a horizontal bar 179 secured to the top of a shaft 180 supported in a hollow post 181 in which the shaft may turn. Attached to the hollow post 181 is a plate 182 having an arcuate slot 184 therein and plate 177 is connected to plate 182 by a bolt 185 which passes through slots 178 and 184, bar 179 being notched out at 186 to permit the bolt to pass therethrough. 187 is merely a spacer employed for leveling purposes. Bolt 189 passes through the other slot 178 and through a hole in bar 179. Thus, to angularly adjust the position of pusher member 162, bolts 185 and 189 are loosened and the entire frame 169 is swung about the vertical axis of post 181 in one direction or the other to the limit allowed by the arcuate slot 184. The pusher may also be bodily adjusted horizontally and radially relative to the vertical axis of post 181 by moving frame 169 and plate 177 on bar 179 to the limit of slot 178. Air cylinder 173 is provided with a stroke adjusting member 190 projecting from the end opposite the piston rod 166. This member controls the length of the stroke of piston rod 166 and hence the length of the stroke of pusher member 160. An adjustable screw 191 set in a cross member 192 at the end of frame 169 determines the outward limit of adjustment of member 190.

When large diameter molds are arranged in closed up or touching relation in transverse rows on conveyor 3, the center to center spacing between said molds is greater than that which would normally occur as between smaller molds. The molds are received on conveyor 6 with scarcely any disturbance of their center to center spacing and when a given group are moved in single file to transfer station G, each mold will stop at substantially the same transfer point relative to the longitudinal centerline of conveyor 7. This transfer point however will vary as the center to center spacing of the molds varies. For example, the transfer point for large molds may be beyond the longitudinal centerline of conveyor 7 whereas the transfer point for smaller molds may occur on or on the opposite side of the longitudinal centerline mentioned, Figure 19.

It is desired to transfer each mold from conveyor 6 to a position in the center laterally of conveyor 7 and between two of the chain lugs 52, preferably with the mold base in close proximity to the rear lug so as to minimize relative movement between the mold and conveyor when the mold enters transfer fork 18 thereby reducing wear on the mold bottom. Ample space is allowed between chain lugs to accommodate molds of both large and small base diameter.

The transfer movement of a mold from the transfer point on conveyor 6 to its position on conveyor 7, Figure 19, is along a radial line leading to a predetermined point on the longitudinal centerline of conveyor 7. Thus, the apparatus provided for transferring molds from conveyor 6 to conveyor 7 is arranged to push the molds, one at a time, along a line radial to the selected center point and the apparatus is angularly adjustable with respect to the point thereby to compensate for variations in the transfer point on conveyor 6 due to differences in the spacing and diameter of the molds.

In transferring molds from conveyor 6 to conveyor 7, Figure 19, they are pushed, one at a time across a stepped plate having an upper surface level 200 flush with the top of conveyor 6 and a lower surface level 200a substantially flush with the top of conveyor 7. The plate is centrally slotted as at 201 so as to straddle conveyor 7 and avoid interference with chain lugs 52. The intermittent movement of conveyor 7 is preferably so regulated that each chain lug 52 will stop in rear of the lower surface level 200a, in position to engage and slide the mold off the lower surface 200a upon movement of the conveyor. Said transfer plate is fixed to the side of the frame for conveyor 6.

At station H, ware is automatically removed from the molds. The apparatus for accomplishing this comprises a vacuum chuck 205, Figures 20, 21, and 22, attached to a hollow rod 206 supported by a holder 207. A hose 208 is connected to rod 206 and to a valve 209 connected to a source of vacuum (not shown). Said valve is operated by a cam 210 on shaft 211 driven by a chain drive 213 connected to a main drive shaft 117. Holder 207 is supported by an upright post 215 whose lower end is received in a socket 216. The post is turned by a cam 217 on shaft 211 and a cam follower 217 secured to the post, to move the vacuum chuck between transfer points and to carry the ware over to conveyor 218 which carries it to the finishing station, not shown.

As each mold enters station H, a mold lifter 220, formed with lifting bars 221 straddling the conveyor so as to engage the mold beneath the brim, is raised by cam 222 on shaft 211 thereby to raise the mold up and engage the ware with the vacuum chuck 205.

Should the ware be cracked or if for some other reason, the transfer apparatus fails to remove the ware from the mold, apparatus is provided at station J for blowing it from the molds into a receiver 223. This apparatus is sometimes called a "stripper" or it may be referred to as mould cleaning or ware stripping apparatus, or mechanism. Said apparatus comprises a high pressure jet 224, adjustable for height on a stand 225 located opposite the receiver 223. This jet is controlled by a magnetic valve 226 operated by a photo-electric relay whose light source 228 is arranged to project a light beam across the top of the mold to a receiver 227. When the light beam is interrupted by a piece of ware, the magnetic valve is automatically actuated to cause a jet of air to strike from the ware and blow it from the mold into the receiver.

From station J, the empty molds are returned on conveyor 7 to the transfer fork 23 which picks them up one at a time and carries them to the feeding station to complete the cycle.

Figure 24:
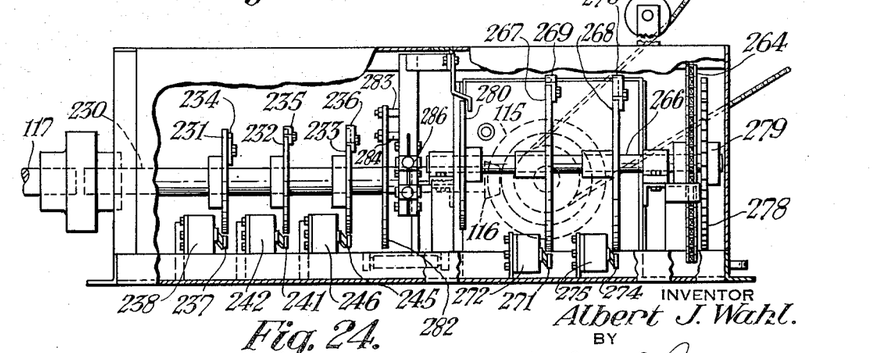
Figure 24 is a side elevation of the apparatus of Figure 23.

A timer 114, Figures 23 and 24 is provided to co-ordinate the operations of mold pushers 87, 98 and 162, mold puller 139 and stop member 134 with each other and with the other operating parts of the machinery. Said timer comprises a timer shaft 230, which is coupled direct to drive shaft 117. There are three discs, 231, 232 and 233 secured to shaft 117 and each disc has an adjustable cam segment bolted thereto. These segment cams are 234, 235 and 236 respectively. Cam 234, operates the control lever 237 of electrical switch 238, connected by circuit wire 239 with a four-way electrically operated air valve 240, Figure 25, whose function it is to control the operation of air cylinder 101 and pusher 98. Cam 235 operates the control lever 241 of electrical switch 242, connected by circuit wire 243 with a four-way electrically operated air valve 244 whose function it is to control the operation of air cylinder 138 which raises and lowers the stop member 134, and the operation of air cylinder 144 which controls the raising of air cylinder 141. Cam 236 operates the control lever 245 of electrical switch 246 connected by circuit wire 247 with a four-way electrically operated air valve 248 whose function is to control the operation of air cylinder 141 which moves the mold puller 139.

A main air supply line 249 is connected by branch pipe 250 to the inlet side of air operated valve 240 from which a flexible hose 251 leads to one side of air cylinder 101 and a flexible hose 252 leads to the other side of the cylinder. 253 is a vent pipe. Branch pipe 254 leads from the main air supply line to electrically operated air valve 244. This valve is connected by conduit 255 with one side of air cylinder 138 and by conduit 256 with the other side of said cylinder. 257 is a vent pipe. Inasmuch as air under pressure is employed only to raise air cylinder 141, Figure 14 this operation is also controlled by air valve 244 and to this end, a branch conduit 258 is connected to conduit 256 and to air cylinder 141. Branch pipe 259 leads from main air supply line 249 to electrically operated air valve 248 and to this valve are connected air lines 260 and 261. 262 is a vent pipe.

In the drawings, Figure 1, the molds are illustrated as being arranged in rows containing five molds each on dryer conveyor 3. This number of course may be changed depending on the diameter of the molds it being clearly obvious that if larger diameter molds are employed, the number in a row may have to be reduced to four or less or if smaller diameter molds are employed, the number may be increased to six or more.

With the mold arrangement shown, air cylinder 101 should be operated to cause pusher 98 to shove a row of five molds off of conveyor 5 onto conveyor 3 after every fifth revolution of main camshaft 25. At the discharge end of the dryer, the stop member 134 and the mold puller 139 are also operated on a one to five ratio with relation to the main camshaft 25 and therefore it is necessary that air valves 240, 244 and 248 operate only once during five revolutions of timer shaft, 230. In order to accomplish this, timer shaft 230 has a sprocket 263 mounted thereon connected by chain 264 with a sprocket 265 on shaft 266. On shaft 266 are fixed two discs 267 and 268, each having an adjustable segment cam 269 and 270 fixed thereon. Cam 269 operates the lever 271 of switch 272 connected by circuit wire 273, Figure 25, with switch 238 and is operable to close the circuit to switch 238 every fifth revolution of timer shaft 117. Cam 270 operates the lever 274 of switch 275 connected by circuit wire 276 to wire 277 connecting switches 242 and 246 to close the circuit to switches 242 and 246 every fifth revolution of timer shaft 117. The length of time the circuits remain closed depends upon the length of cams 269 and 270.

When the number of molds in a dryer row is changed from, say for instance, five to six, then shaft 266 should turn once in every six revolutions of shaft 25. If the number is changed to seven, the ratio should be seven to one and so on. To change the ratio, shaft 266 may have fixed thereon one or more additional sprockets 278, of different diameter and number of teeth, which can be slid into place by the simple expedient of loosening set screws and disconnecting the sprocket chain. A spring pressed idler 279 can be employed to automatically take up any additional slack occasioned by the substitution of sprockets. During the operation, neither shaft 266 or shaft 230 should be rotated lest the angular adjustment of the two sets of cams become disturbed. By means of calibrated dials 280 and 281 fixed on shafts 266 and 230 respectively, the possibility of timing errors of this nature may be avoided.

Air cylinder 173, which moves the mold pusher 162 is controlled by a disc 282 fixed on shaft 230 having spaced concentric circles of holes therein in which a pin 283 is received in the outer row of holes and a pin 284 is received in the inner row of holes. These pins are adapted to move a lever 285, for operating a valve 286, back and forth. As the disc revolves, pin 283 will strike a roller 287 mounted on the end of lever 285 and will shift the lever in one direction. Pin 284 will strike the roller on the other side and shift the lever in the opposite direction. Changes in the timing of valve operation may be accomplished by repositioning the pins. Valve 286 is connected by a pipe 288, Figure 25, with main air supply line 249 and with air cylinder 173 by flexible hose connections 289 and 290. 291 is a vent pipe.

Substantially all round jiggered items may be produced with this apparatus. In the case of small diameter ware, where faster jiggering speeds may be employed, the production speed of the jiggering machine may be increased over the production speed normally employed for larger diameter ware requiring a longer interval of time for jiggering. Within these two categories there may be however several shapes and sizes of ware representing mold diameters that vary over a considerable range. To take an example, a large dinner plate may require a mold having an overall diameter of 12½ inches, whereas, a salad plate may require a mold having an overall diameter of only 10 inches, yet, both may be advantageously jiggered at the same speed and the output per given interval of time may be the same for both.

The jiggering machine and mold pushers 87 and 162 operate at the same speed. Thus if the production speed of the jiggering machine is increased or decreased, the periodicity of the operation of pushers 87 and 162 are likewise increased or decreased a corresponding amount. The reason for this is, of course, obvious. The function of pusher 87 is to remove molds from the jiggering machine and the function of pusher 162 is to place them on the return conveyor.

The dryer conveyor has an upper run of predetermined and constant length and width. It represents a surface area which will accommodate a given number of molds of one diameter and different number of molds of another diameter if loaded to capacity. The width of the dryer conveyor, being a constant, will accommodate a row of molds containing a given number of one diameter and a greater or lesser number of another diameter, as the case may be. The lineal speed of travel of conveyor 3 may however be varied.

In a case where the production is changed from a smaller diameter item to a larger diameter item involving the use of larger diameter molds, the number of molds to be accommodated in a single row on conveyor 3 may be reduced, say for example, from seven to five, and by virtue of the larger diameter of the molds, a greater center to center spacing of molds on conveyor 5 and mold rows on conveyor 3 may be necessary. Assuming that the production speed of the jiggering machine is not to be altered, then the amount of intermittent lineal travel of conveyor 5 is increased by substituting a sprocket of proper diameter to give the desired travel, for sprocket 80, Figure 11.

When reducing the number of molds in a row from seven to five, the pusher 98 is timed to operate after five molds have been moved to a position in front of the blade or after every fifth movement of conveyor 5. The method of making changes in the time and periodicity of operation of this pusher has already been explained, however, let it suffice to say that the sprocket chain 264 is shifted to the proper sprocket on shaft 266 to give the desired periodicity and such adjustment as may be necessary is made in the position of cams 271 and 231 on their respective discs if a change in the time of operation of the pusher within the cycle is indicated.

If the lineal speed of travel of conveyor 3 per given interval of time to be changed, a sprocket of proper diameter to give the desired amount of travel is substituted for sprocket 112. Said conveyor is driven continuously by the fabricating machine and therefore, the adjustment would involve either slowing down or accelerating the speed of travel of the conveyor. In reducing the number of molds per row because of an increase in the diameter of the molds being placed in service, the lineal speed of travel of the conveyor may be increased depending upon the time cycle of the pusher 98. For example, if the production speed of the jiggering machine is twenty pieces of ware (molds) per minute and the production is being made on 10 inch overall diameter molds assembled in rows of seven each on the dryer conveyor 3, the lineal travel of the conveyor per minute, allowing an 11 inch center to center spacing of mold rows, would be approximately 33 inches, however, if the production is changed to ware requiring a mold of 12 inch overall diameter arranged in rows of five each, then the lineal travel of conveyor 3 per minute, allowing a 13 inch center to center spacing between rows would amount to 65 inches. Therefore, a reduction in the number of molds per row resulting in increased spacing between mold rows may require a higher speed of travel of the dryer conveyor.

The rate of delivery of consecutive rows of molds to dryer conveyor 3 and the rate of discharge of successive rows of molds therefrom is substantially uniform. That is to say, for a given size of mold, the delivery and discharge may occur at ten second intervals and for another size, at fifteen second intervals, etc. This does not mean, however, that the delivery operation and the discharge operation necessarily occur at the same instant. As a matter of fact, the cycle of operations involved in accumulating a row of molds and placing the same on the dryer conveyor, may be consummated before or after the operation of discharging a row of molds to gravity conveyor 121 takes place. This, however, does not interfere with the reliable delivery of the molds to conveyor 6 which is driven in timed relation with conveyor 7 that returns molds in predetermined spaced relation to the fabricating machine.

The elevatable barrier 134 guards the approach to conveyor 6 and is not lowered until conveyor 6 has been moved a requisite number of times to transport the molds of a preceding row away from the molding zone of said conveyor. The mold puller 139 operates in timed relation with conveyor 6 and is caused to be projected over gravity conveyor 121 and lowered behind a row of molds held at the barrier at or about the time the last mold of the preceding row is being removed from the loading zone onto conveyor 6. The barrier 134 is dropped as conveyor 6 comes to rest and the mold puller 139 is then actuated to pull the molds onto conveyor 6 while the conveyor is stationary. The mold puller is then raised out of contact with the row of molds and they are then carried by conveyor 6 to the transfer point G where mold pusher 162, which operates in timed relation with conveyor 7, transfers them one at a time thereto. The amount of intermittent travel of conveyor 6 may be changed by substituting sprockets of the desired diameter for sprocket 156. The amount of intermittent travel imparted to conveyor 6 is the same as that imparted to conveyor 5 and when changes are made in the amount of travel of one conveyor, the same change is made with respect to the other.

With regard to conveyor 7, it will be understood that the spacing between chain lugs 52 is sufficient to accommodate the maximum diameter mold base employed of the several mold sizes which may be used with the apparatus. While it is detrimental to the bases of the molds to slide them over the surface of the flat top chain 7, a small amount of relative movement may occur, however, it is preferred to load molds on this conveyor in an off-center position relative to two consecutive chain lugs with the mold base in close adjacency to the rearmost of two consecutive lugs. Thus, when the mold moves into transfer fork 17, there is a relatively small amount of slippage between the mold and conveyor.

I claim:

1. Apparatus for making dinnerware comprising an automatic fabricating machine adapted to feed clay to molds delivered thereto and fabricate the clay thereon, said molds being carried in series through the machine, a dryer for drying fabricated ware having a flat surfaced wide conveyor extending therethrough, a transfer conveyor extending transversely of said dryer near its entrance end, means for transferring said molds from said machine to said transfer conveyor, said transfer conveyor carrying said molds across the entrance end of the dryer for forming a row of molds extending transversely of said end, mold pushing means periodically reciprocable in the direction of the travel of said dryer conveyor for engaging each row so formed on said transfer conveyor and moving that row onto said dryer conveyor whereby said molds are carried through the dryer in rows arranged transversely of the dryer conveyor, means for adjusting the frequency of the reciprocation of said pushing means so as to effect actuation of the pushing means after a predetermined number of molds are arranged in a row on said transfer conveyor, a mold return conveyor leading from a mold-receiving position near the discharge end of said dryer conveyor to a mold-delivery position near said fabricating machine, a second transfer conveyor extending laterally from said dryer conveyor for delivering said molds from the dryer conveyor to a position near said mold-receiving end of said return conveyor, a second mold-pushing means periodically reciprocable toward said mold-receiving end of the return conveyor for engaging said delivered molds and loading them in series on said return conveyor, and automatically operable means disposed near said mold delivery end of the return conveyor for returning empty molds to said fabricating machine.

2. Apparatus for making dinnerware comprising an automatic fabricating machine adapted to feed clay to molds delivered thereto and fabricate the clay thereon, said molds being carried in series through the machine, a dryer for drying fabricated ware having a flat surfaced wide conveyor extending therethrough, a transfer conveyor extending transversely of said dryer near its entrance end, means for transferring said molds from said machine to said transfer conveyor, said transfer conveyor carrying said molds across the entrance end of the drier for forming a row of molds extending transversely of said end, the speed of said transfer conveyor relative to the rate at which molds are transferred thereto being adjustable for effecting a desired spaced relationship of the molds on said conveyor, mold pushing means periodically reciprocable in the direction of the travel of said dryer conveyor for engaging each row so formed on said transfer conveyor and moving that row onto said dryer conveyor whereby said molds are carried through the dryer in rows arranged transversely of the dryer conveyor, means for adjusting the frequency of the reciprocation of said pushing means so as to effect actuation of the pushing means after a predetermined number of molds are arranged in a row on said transfer conveyor, a mold return conveyor leading from a mold-receiving position near the discharge end of said dryer conveyor to a mold-delivery position near said fabricating machine, a second transfer conveyor extending laterally from said dryer conveyor for delivering said molds from the dryer conveyor to a position near said mold-receiving end of said return conveyor, a second mold-pushing means periodically reciprocable toward said mold-receiving end of the return conveyor for engaging said delivered molds and loading them in series on said return conveyor, and automatically operable means disposed near said mold delivery end of the return conveyor for returning empty molds to said fabricating machine.

3. Apparatus for making dinnerware comprising an automatic fabricating machine adapted to feed clay to molds delivered thereto and fabricate the clay thereon, a dryer for drying fabricated ware having a conveyor extending therethrough, a transfer conveyor extending transversely of said dryer near its entrance end, means for transferring said molds from said machine to said transfer conveyor, mold pushing means periodically reciprocable in the direction of the travel of said dryer conveyor for engaging a plurality of molds on said transfer conveyor and moving them onto said dryer conveyor in rows arranged transversely thereof, a mold return conveyor leading from a mold-receiving position near the discharge end of said dryer conveyor to a mold-delivery position near said fabricating machine, a roller conveyor extending downwardly from the discharge end of said dryer conveyor, said roller conveyor having the roller adjacent said discharge end driven at a faster rate than said dryer conveyor for separating the rows of molds as they are discharged from said conveyor, a second transfer conveyor extending laterally from said dryer conveyor for delivering said molds from the dryer conveyor to a position near said mold-receiving end of said return conveyor, said roller conveyor extending from the dryer conveyor to said second transfer conveyor, a second mold-pushing means periodically reciprocable toward said mold-receiving end of the return conveyor for engaging said delivered molds and loading them in series on said return conveyor, automatic means associated with said return conveyor for removing said dried ware from the molds, and automatically operable means disposed near said mold delivery end of the return conveyor for returning empty molds to said fabricating machine.

4. Apparatus for making dinnerware comprising an automatic fabricating machine adapted to feed clay to molds delivered thereto and fabricate the clay thereon, a dryer for drying fabricated ware having a conveyor extending therethrough, a transfer conveyor extending transversely of said dryer near its entrance end, means for transferring said molds from said machine to said transfer conveyor, mold pushing means periodically reciprocable in the direction of the travel of said dryer conveyor for engaging a plurality of molds on said transfer conveyor and moving them onto said dryer conveyor in rows arranged transversely thereof, a mold return conveyor leading from a mold-receiving position near the discharge end of said dryer conveyor to a mold-delivery position near said fabricating machine, a second transfer conveyor extending laterally from said dryer conveyor for delivering said molds from the dryer conveyor to a position near said mold-receiving end of said return conveyor, a gravity conveyor extending between the discharge end of the dryer conveyor and said second transfer conveyor, a barrier for temporarily arresting the movement of a row of molds over said gravity conveyor, a mold puller for drawing said arrested row onto said second transfer conveyor when said barrier is withdrawn, said gravity conveyor having a portion thereof in front of said barrier positively driven at a rate of speed greater than said dryer conveyor for separating rows of molds as they are discharged from the dryer conveyor, a second mold-pushing means periodically reciprocable toward said mold-receiving end of said return conveyor for engaging said molds on said second transfer conveyor and loading them in series on said return conveyor, and automatically operable means disposed near said mold delivery end of the return conveyor for returning empty molds to said fabricating machine.

5. Apparatus for making dinnerware comprising an automatic fabricating machine adapted to feed clay to molds delivered thereto and fabricate the clay thereon, a dryer for drying fabricated ware having a conveyor extending therethrough, a transfer conveyor extending transversely of said dryer near its entrance end, means for transferring said molds from said machine to said transfer conveyor, mold pushing means periodically reciprocable in the direction of the travel of said dryer conveyor for engaging a plurality of molds on said transfer conveyor and moving them onto said dryer conveyor in rows arranged transversely thereof, a mold return conveyor leading from a mold-receiving position near the discharge end of said dryer conveyor to a mold-delivery position near said fabricating machine, a second transfer conveyor extending laterally from said dryer conveyor for receiving molds delivered from the dryer conveyor and carrying them to a position near said mold-receiving end of said return conveyor, a second mold-pushing means periodically reciprocable toward said mold-receiving end of the return conveyor for engaging said molds on said second transfer conveyor and loading them in series on said return conveyor, a roller conveyor extending downwardly from the discharge end of said dryer conveyor to said second transfer conveyor, a barrier for temporarily arresting movement of a row of molds over said gravity conveyor, said barrier extending approximately the width of said roller conveyor and being adapted to be reciprocated upwardly and downwardly through an adjacent pair of said rollers, said pair being spaced to permit said reciprocation, a mold puller for assuring delivery of a row of molds onto said second transfer conveyor, said roller conveyor having the roller adjacent to the discharge end of said dryer conveyor driven at a faster rate than said dryer conveyor for separating the rows of molds as they are dicharged from said conveyor, the operation of said barrier and puller being so co-ordinated with the rate of travel of said second transfer conveyor as to avoid delivery of a succeeding row of molds until the preceding row has been removed from said conveyor, and automatically operable means disposed near said mold delivery end of the return conveyor for returning empty molds to said fabricating machine.

6. Apparatus for making dinnerware comprising an automatic fabricating machine adapted to feed clay to molds delivered thereto and fabricate the clay thereon, a dryer for drying fabricated ware having a conveyor extending therethrough, an intermittently driven transfer conveyor extending transversely of said dryer near its entrance end, means for transferring said molds from said machine to said transfer conveyor, said means including an intermittently-driven mold conveyor extending in a substantially longitudinal direction from said fabricating machine to a mold transfer point substantially in transverse alignment with said transverse transfer conveyor and a periodically reciprocable pusher arm disposed near said transfer point for engaging and moving said molds from said longitudinal to said transverse conveyor, mold pushing means periodically reciprocable in the direction of the travel of said dryer conveyor for engaging a plurality of molds on said transfer conveyor and moving them onto said dryer conveyor in rows arranged transversely thereof, said longitudinal and transverse conveyors being co-ordinated with the operations of said fabricating machine and said pusher arm and pushing means being reciprocated when said conveyor are stationary to effect the said mold transfer, a mold return conveyor leading from a mold-receiving position near the discharge end of said dryer conveyor to a mold-delivery position near said fabricating machine, an additional transfer conveyor extending laterally from said dryer conveyor for delivering said molds from the dryer conveyor to a position near said mold-receiving end of said return conveyor, a second mold-pushing means periodically reciprocable toward said mold-receiving end of the return conveyor for engaging said delivered molds and loading them in series on said return conveyor, and automatically operable means disposed near said mold delivery end of the return conveyor for returning empty molds to said fabricating machine.

7. Apparatus for making dinnerware comprising an automatic fabricating machine adapted to feed clay to molds delivered thereto and fabricate the clay thereon, a dryer for drying fabricated ware having a conveyor extending therethrough, a transfer conveyor extending transversely of said dryer near its entrance end, means for transferring said molds from said machine to said transfer conveyor, mold pushing means periodically reciprocable in the direction of the travel of said dryer conveyor for engaging a plurality of molds on said transfer conveyor and moving them onto said dryer conveyor in rows arranged transversely thereof, an intermittently-driven mold return conveyor leading from a mold-receiving position near the discharge end of said dryer conveyor to a mold-delivery position near said fabricating machine, an intermittently-driven second transfer conveyor extending laterally from said dryer conveyor for delivering said molds from the dryer conveyor to a position near said mold-receiving end of said return conveyor, a second mold-pushing means periodically reciprocable toward said mold-receiving end of the return conveyor for engaging said delivered molds and loading them in series on said return conveyor, and automatically operable mold-returning means disposed near said mold delivery end of the return conveyor for transferring empty molds to said fabricating machine, said intermittent return and second transfer conveyors being co-ordinated with the operation of said fabricating machine and both said second mold-pushing means and mold-returning means operating when said intermittent conveyors are stationary to effect the above-mentioned mold transfers.

8. Apparatus for making dinnerware comprising an automatic fabricating machine adapted to feed clay to molds delivered thereto and fabricate the clay thereon, a dryer for drying fabricated ware having a continuously driven conveyor extending therethrough, an intermittently-driven transfer conveyor extending transversely of said dryer near its entrance end, means for transferring said molds from said machine to said transfer conveyor, said means including an intermittently-driven mold conveyor extending in a substantially longitudinal direction from said fabricating machine to a mold transfer point substantially in transverse alignment with said transverse transfer conveyor and a periodically reciprocable pusher arm disposed near said transfer point for engaging and moving said molds from said longitudinal to said transverse conveyor, mold pushing means periodically reciprocable in the direction of the travel of said dryer conveyor for engaging a plurality of molds on said transfer conveyor and moving them onto said dryer conveyor in rows arranged transversely thereof, an intermittently driven mold return conveyor leading from a mold-receiving position near the discharge end of said dryer conveyor to a mold-delivery position near said fabricating machine, an intermittently driven second transfer conveyor extending laterally from said dryer conveyor for delivering said molds from the dryer conveyor to a position near said mold-receiving end of said return conveyor, a second mold-pushing means periodically reciprocable toward said mold-receiving end of the return conveyor for engaging said delivered molds and loading them in series on said return conveyor, and automatically operable mold-returning means disposed near said mold delivery end of the return conveyor for transferirng empty molds to said fabricating machine, said intermittently driven conveyors being co-ordinated with the operations of said fabricating machine, and each of said mold pushers as well as said mold-returning means operating when said intermittent conveyors are stationary to effect the above-mentioned transfers.

9. Apparatus for making dinnerware comprising an automatic fabricating machine adapted to feed clay to molds delivered thereto and fabricate the clay thereon, a drive for effecting the various operations of said machine, a dryer for drying fabricated ware having a continuously-driven conveyor extending therethrough, an intermittenly-driven transfer conveyor extending transversely of said dryer near its entrance end, means for transferring said molds from said machine to said transfer conveyor, fluid-operated mold-pushing means periodically reciprocable in the direction of the travel of said dryer conveyor for engaging a plurality of molds on said transfer conveyor and moving them onto said dryer conveyor in rows arranged transversely thereof, an intermittently-driven mold return conveyor leading from a mold-receiving position near the discharge end of said dryer conveyor to a mold-delivery position near said fabricating machine, an intermittently-driven second transfer conveyor extending laterally from said dryer conveyor for delivering said molds from the dryer conveyor to a position near said mold-receiving end of said return conveyor, a second fluid-operated mold-pushing means periodically reciprocable toward said mold-receiving end of the return conveyor for engaging said delivered molds and loading them in series on said return conveyor, automatically operable mold-returning means disposed near said mold delivery end of the return conveyor for transferring empty molds to said fabricating machine, all of said conveyors being operatively connected to and controlled by said fabricating machine drive, and timing mechanism for periodically reciprocating said mold-pushing means, said timing mechanism being mechanically connected to said machine drive and being pre-set so as to effect mold-handling reciprocations of said pushing means during periods of idleness of said intermittent conveyors.

10. Apparatus for making dinnerware comprising an automatic fabricating machine adapted to feed clay to molds delivered thereto and fabricate the clay thereon, a drive for effecting the various operations of said machine, a dryer for drying fabricated ware having a continuously-driven conveyor extending therethrough, an intermittently-driven transfer conveyor extending transversely of said dryer near its entrance end, means for transferring said molds from said machine to said transfer conveyor, fluid-operated mold-pushing means periodically reciprocable to the direction of the travel of said dryer conveyor for engaging a plurality of molds on said transfer conveyor and moving them onto said dryer conveyor in rows arranged transversely thereof, an intermittently-driven mold return conveyor leading from a mold-receiving position near the discharge end of said dryer conveyor to a mold-delivery position near said fabricating machine, an intermittently-driven second transfer conveyor extending laterally from said dryer conveyor for delivering said molds from the dryer conveyor to a position near said mold-receiving end of said return conveyor, a gravity conveyor for moving said rows of molds from said dryer conveyor to said second transfer conveyor, a fluid-operated reciprocable barrier movable into and away from mold-arresting position in said gravity conveyor, a fluid-operated mold puller, a second fluid-operated mold-pushing means periodically reciprocable toward said mold-receiving end of said return conveyor for engaging said delivered molds in said second transfer conveyor, and loading them in series on said return conveyor, automatically operable mold-returning means disposed near said mold delivery end of the return conveyor for transferring empty molds to said fabricating machine, said intermittent conveyors being operatively connected to and controlled by said fabricating machine drive, and a timer also operatively connected to and co-ordinated with said drive for effecting mold-releasing movement of said barrier during periods of idleness of said second return conveyor and mold-handling movements of said mold-pulling and pushing means during periods of idleness of said first transfer and said return conveyors.

ALBERT J. WAHL.

REFERENCES CITED

The following references are of record in the file of this patent:

UNITED STATES PATENTS

| Number | Name | Date |
| --- | --- | --- |
| 915,542 | Biertuempfel | Mar. 16, 1909 |
| 1,200,244 | Sears | Oct. 3, 1916 |
| 1,838,277 | Miller | Dec. 29, 1931 |
| 1,842,912 | McNamara | Jan. 26, 1932 |
| 1,906,786 | Bowman et al. | May 2, 1933 |
| 2,046,525 | Miller | July 7, 1936 |
| 2,160,484 | Miller | May 30, 1939 |
| 2,258,658 | Miller | Oct. 14, 1941 |
| 2,346,575 | Hallowell, Jr. | Apr. 11, 1944 |
| 2,409,172 | Miller | Oct. 8, 1946 |